United States Patent
Zou et al.

(10) Patent No.: US 7,930,570 B2
(45) Date of Patent: Apr. 19, 2011

(54) POWER SUPPLY CONTROL CIRCUIT

(75) Inventors: Hua Zou, Shenzhen (CN); Feng-Long He, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 462 days.

(21) Appl. No.: 12/189,106

(22) Filed: Aug. 8, 2008

(65) Prior Publication Data

US 2009/0300375 A1    Dec. 3, 2009

(30) Foreign Application Priority Data

May 30, 2008    (CN) .......................... 2008 1 0301851

(51) Int. Cl.
*H03K 17/687* (2006.01)
*H03K 17/16* (2006.01)

(52) U.S. Cl. ......... 713/300; 713/310; 327/431; 327/434

(58) Field of Classification Search .................. 713/300, 713/310; 327/431, 434
See application file for complete search history.

(56) References Cited

U.S. PATENT DOCUMENTS

| | | | | |
|---|---|---|---|---|
| 4,486,673 | A * | 12/1984 | Koike | 327/210 |
| 7,659,773 | B2 * | 2/2010 | Choi et al. | 327/544 |
| 7,812,647 | B2 * | 10/2010 | Williams | 327/110 |
| 2005/0218959 | A1 * | 10/2005 | Yamawaki et al. | 327/334 |
| 2008/0123799 | A1 * | 5/2008 | Otose | 377/68 |
| 2008/0180157 | A1 * | 7/2008 | Choi et al. | 327/384 |
| 2008/0197908 | A1 * | 8/2008 | Williams | 327/431 |
| 2009/0016083 | A1 * | 1/2009 | Soldano et al. | 363/20 |

* cited by examiner

*Primary Examiner* — Abdelmoniem Elamin
(74) *Attorney, Agent, or Firm* — Zhigang Ma

(57) ABSTRACT

An exemplary power supply control circuit includes a first electric switch, a second electric switch, a third electric switch, a power supply, and an output terminal. The first electric switch has a first terminal connected to an SIO chip to receive a control signal. When the control signal is at a high level, the first electric switch is turned on, the second electric switch is turned off, the third electric switch is turned off, and the output terminal outputs no power supply. When the control signal is at a low level, the first electric switch is turned off, the second electric switch is turned on, the third electric switch is turned on, and the output terminal outputs the power supply.

7 Claims, 1 Drawing Sheet

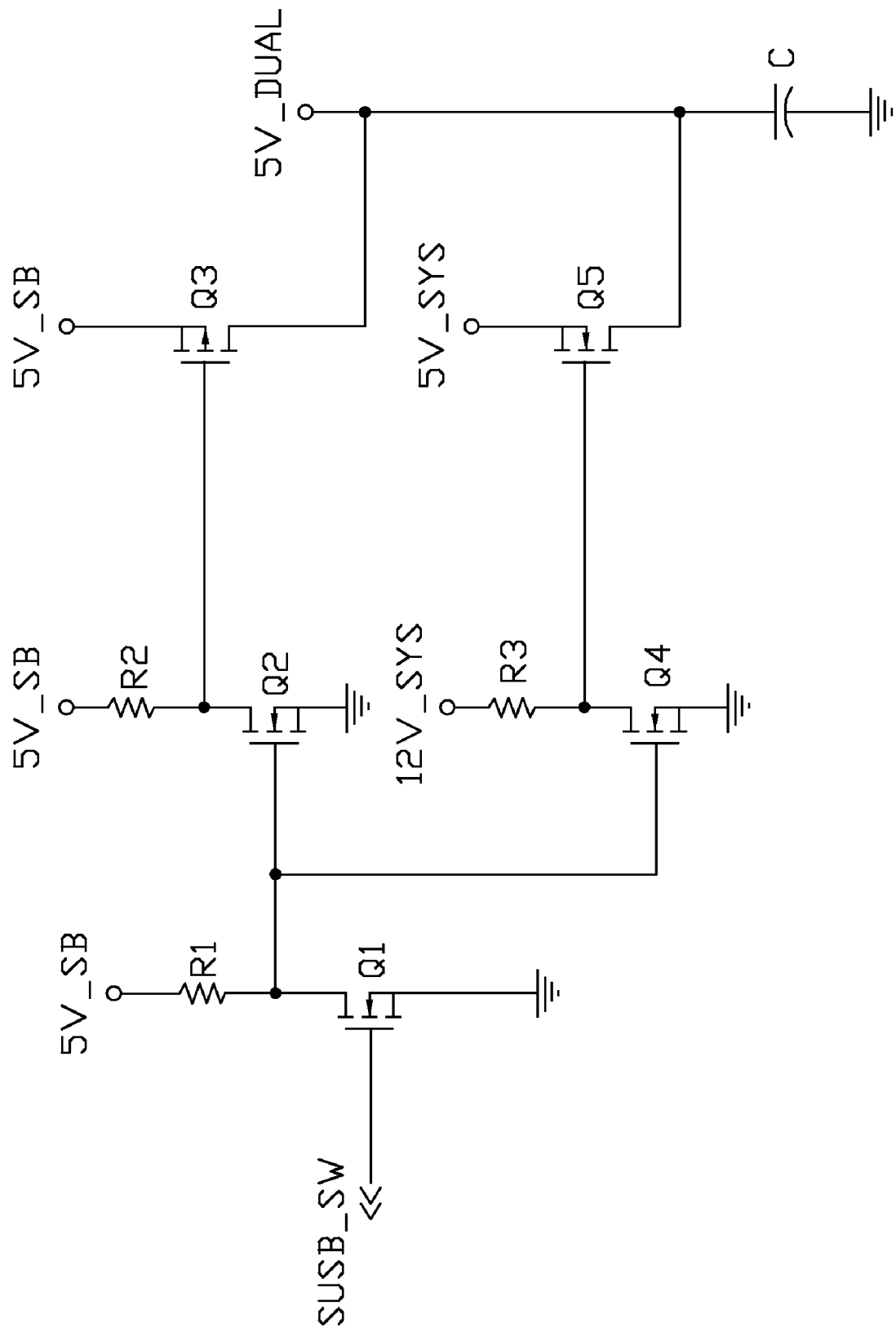

POWER SUPPLY CONTROL CIRCUIT

BACKGROUND

1. Field of the Invention

The present invention relates to a power supply control circuit.

2. Description of Related Art

Nowadays, power supply control circuits, such as switching power supply circuits, are widely used in computer products. When a computer is turned off via software installed therein, a power supply control circuit in the computer still outputs a 5V standby power supply to a motherboard of the computer for turning on the computer quickly the next time. However, if the computer is not used for a long time, the 5V standby power supply is wasted.

What is needed is to provide a power supply control circuit which can save electricity after a computer is turned off via software installed therein.

BRIEF DESCRIPTION OF THE DRAWING

The drawing is a circuit diagram of a power supply control circuit in accordance with an embodiment of the present invention.

DETAILED DESCRIPTION

Referring to the drawing, a power supply control circuit in accordance with an embodiment of the present invention includes five transistors Q1-Q5 functioning as electric switches, three resistors R1-R3, a capacitor C, and an output terminal 5V_DUAL. In this embodiment, the transistors Q1, Q2, Q4, and Q5 are N-channel metal-oxide-semiconductor field-effect transistors (MOSFETs), the transistor Q3 is a P-channel MOSFET, the resistors R1-R3 are current-limiting resistors, and the capacitor C is a filtering capacitor.

The gate of the transistor Q1 is connected to a super input/output (SIO) chip to receive a control signal SUSB_SW. The drain of the transistor Q1 is connected to a standby power supply, such as a 5V standby power supply 5V_SB, via the resistor R1, and also connected to the gates of the transistors Q2 and Q4. The drain of the transistor Q2 is connected to the 5V standby power supply 5V_SB via the resistor R2. The drain of the transistor Q4 is connected to a first system power supply, such as a 12V system power supply 12V_SYS, via the resistor R3. The sources of the transistors Q1, Q2, and Q4 are grounded. The gate of the transistor Q3 is connected to the drain of the transistor Q2. The source of the transistor Q3 is connected to the 5V standby power supply 5V_SB. The gate of the transistor Q5 is connected to the drain of the transistor Q4. The source of the transistor Q5 is connected to a second system power supply, such as a 5V system power supply 5V_SYS. The drains of the transistors Q3 and Q5 are connected to the output terminal 5V_DUAL, and grounded via the capacitor C. According to the specification of the control signal SUSB_SW, when a computer is in a working state or an off state, the control signal SUSB_SW is at a high level, and when the computer is in a sleep state, the control signal SUSB_SW is at a low level. In this embodiment, the off state is when the computer is turned off via software installed therein, but an external power supply offering power to the computer is not cut off.

When the computer is in the working state, the motherboard of the computer offers various power supplies needed by the computer, including the 5V standby power supply 5V_SB, the 12V system power supply 12V_SYS, and the 5V system power supply 5V_SYS. At this time, the transistor Q1 is turned on since the control signal SUSB_SW is at a high level. The transistors Q2 and Q4 are turned off since the drain of the transistor Q1 is at a low level. The transistor Q3 is turned off since the drain of the transistor Q2 is at a high level. The transistor Q5 is turned on since the drain of the transistor Q4 is at a high level. Therefore, the output terminal 5V_DUAL outputs the 5V system power supply 5V_SYS.

When the computer is in the sleep state or the off state, the motherboard of the computer only offers the 5V standby power supply 5V_SB. The drains of the transistors Q4 and Q5 receive no power. When the computer is in the sleep state, the transistor Q1 is turned off since the control signal SUSB_SW is at a low level. The transistor Q2 is turned on since the drain of the transistor Q1 is at a high level. The transistor Q3 is turned on since the drain of the transistor Q2 is at a low level. Therefore, the output terminal 5V_DUAL outputs the 5V standby power supply 5V_SB. When the computer is in the off state, the transistor Q1 is turned on since the control signal SUSB_SW is at a high level. The transistor Q2 is turned off since the drain of the transistor Q1 is at a low level. The transistor Q3 is turned off since the drain of the transistor Q2 is at a high level. Therefore, the output terminal 5V_DUAL does not output any power.

In the above-described power supply control circuit, when the computer is in the working state, the output terminal 5V_DUAL outputs the 5V system power supply 5V_SYS, when the computer is in the sleep state, the output terminal 5V_DUAL outputs the 5V standby power supply 5V_SB, and when the computer is in the off state, the output terminal 5V_DUAL does not output any power, which can save power. In other embodiments, the standby power supply, the first system power supply, and the second system power supply can be replaced by other power supplies.

It is to be understood, however, that even though numerous characteristics and advantages of the present invention have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A power supply control circuit for a computer, comprising:
    a first electric switch comprising a control terminal connected to a super input/output chip to receive a control signal, a power terminal connected to a standby power supply, and a ground terminal, wherein the control signal is high when the computer is in a working state and an off state, and low when the computer is in a sleep state;
    a second electric switch comprising a control terminal connected to the power terminal of the first electric switch, a power terminal connected to the standby power supply, and a ground terminal;
    a third electric switch comprising a control terminal connected to the power terminal of the second electric switch, a power terminal connected to the standby power supply, and an output terminal;
    a fourth electric switch comprising a control terminal connected to the power terminal of the first electric switch, a power terminal connected to a first system power supply, and a ground terminal; and
    a fifth electric switch comprising a control terminal connected to the power terminal of the fourth electric switch, a power terminal connected to a second system power supply, and an output terminal connected to the output terminal of the third electric switch;

wherein upon a condition that the computer is in the working state, the standby power supply and the first and second power supplies are provided, the first electric switch is turned on, the second and fourth electric switches are turned off, the third electric switch is turned off, the fifth electric switch is turned on, the output terminal of the fifth electric switch outputs the second system power supply;

upon a condition that the computer is in the sleep state, only the standby power supply is provided, the first electric switch is turned off, the second electric switch is turned on, the third electric switch is turned on, and the output terminal of third electric switch outputs the standby power supply; and upon a condition that the computer is in the off state, only the standby power supply is provided, the first electric switch is turned on, the second electric switch is turned off, the third electric switch is turned off, and the output terminal of the third electric switch outputs no power supply.

2. The power supply control circuit as claimed in claim 1, wherein the power terminal of the first electric switch is connected to the standby power supply via a first resistor; the power terminal of the second electric switch is connected to the standby power supply via a second resistor; the power terminal of the fourth electric switch is connected to the first system power supply via a third resistor; the output terminals of the third and fifth electric switches are grounded via a capacitor.

3. The power supply control circuit as claimed in claim 1, wherein the first, second, and fourth electric switches are N-channel metal-oxide-semiconductor field-effect transistors (MOSFETs); the control, power, and ground terminals of each of the first, second, and fourth electric switches are gate, drain, and source respectively.

4. The power supply control circuit as claimed in claim 1, wherein the third electric switch is a P-channel MOSFET, the fifth electric switch is an N-channel MOSFET; the control, power, and output terminals of each of the third and fifth electric switches are gate, source, and drain respectively.

5. The power supply control circuit as claimed in claim 1, wherein the standby power supply is a 5 V standby power supply.

6. The power supply control circuit as claimed in claim 1, wherein the first system power supply is a 12 V system power supply.

7. The power supply control circuit as claimed in claim 1, wherein the second system power supply is a 5 V system power supply.

* * * * *